United States Patent
Hao

(10) Patent No.: US 11,949,479 B2
(45) Date of Patent: Apr. 2, 2024

(54) METHODS, APPARATUSES, AND COMPUTER SOFTWARE PRODUCTS FOR PROCESSING IN MIMO SYSTEM

(71) Applicant: Nokia Technologies Oy, Espoo (FI)

(72) Inventor: Jinping Hao, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 512 days.

(21) Appl. No.: 17/263,337

(22) PCT Filed: Aug. 2, 2018

(86) PCT No.: PCT/CN2018/098358
§ 371 (c)(1),
(2) Date: Jan. 26, 2021

(87) PCT Pub. No.: WO2020/024225
PCT Pub. Date: Feb. 6, 2020

(65) Prior Publication Data
US 2021/0175951 A1    Jun. 10, 2021

(51) Int. Cl.
*H04B 7/06* (2006.01)
*H04B 7/0452* (2017.01)
*H04B 7/0456* (2017.01)

(52) U.S. Cl.
CPC ......... *H04B 7/0626* (2013.01); *H04B 7/0456* (2013.01); *H04B 7/066* (2013.01); *H04B 7/0452* (2013.01)

(58) Field of Classification Search
CPC .... H04B 7/0626; H04B 7/0456; H04B 7/066; H04B 7/0452; H04B 7/0619; H04B 7/0486; H04B 7/0632
See application file for complete search history.

(56) References Cited

U.S. PATENT DOCUMENTS

| | | | |
|---|---|---|---|
| 9,432,099 B2 | 8/2016 | Ko et al. | |
| 10,694,531 B2* | 6/2020 | Sun | H04W 72/121 |
| 2015/0016379 A1* | 1/2015 | Nam | H04B 7/0617 |
| | | | 370/329 |
| 2016/0182137 A1 | 6/2016 | Onggosanusi | |
| 2016/0353424 A1 | 12/2016 | Stirling-Gallacher et al. | |
| 2019/0199410 A1* | 6/2019 | Zhao | H04B 7/0413 |

FOREIGN PATENT DOCUMENTS

CN   104247289 A   12/2014
WO   WO 2017/161590 A1   9/2017

OTHER PUBLICATIONS

Sajadieh et al "Progressive Channel State Information for Advanced Multi-User MIMO in Next Generation", IEEE, 2016 (Year: 2016).*

* cited by examiner

*Primary Examiner* — Omer S Mian
(74) *Attorney, Agent, or Firm* — Harrington & Smith

(57) ABSTRACT

One example of this disclosure includes sending codebook based sweeping information to at least one UE; receiving Precoding Index reports from said at least one UE; grouping said at least one UE into at least one group, wherein the UEs in the same group are covered by the same transmitting precoding; sending beamformed CSI-RS in accordance with said at least one group; receiving CSI reports from UEs of said at least one group, so as to transfer data to said at least one UE accordingly.

20 Claims, 3 Drawing Sheets

METHODS, APPARATUSES, AND COMPUTER SOFTWARE PRODUCTS FOR PROCESSING IN MIMO SYSTEM

CROSS REFERENCE TO RELATED APPLICATION

This patent application is a U.S. National Stage application of International Patent Application Number PCT/CN2018/098358 filed Aug. 2, 2018, which is hereby incorporated by reference in its entirety.

TECHNICAL FIELD

Various example embodiments relate generally to wireless communication and, more specifically, relates to massive Multiple Input Multiple Output (MIMO) antenna systems.

BACKGROUND

This section is intended to provide a background or context to the invention disclosed below. The description herein may include concepts that could be pursued but are not necessarily ones that have been previously conceived, implemented or described. Therefore; unless otherwise explicitly indicated herein, what is described in this section is not prior art to the description in this application and is not admitted being prior art by inclusion in this section. Abbreviations that may be found in the specification and/or the drawing figures are defined below, after the main part of the detailed description section.

In future wireless system, non-orthogonal multiple access (NOMA) is regarded as an important radio access technology to achieve multi-user capacity. In some scenarios, such as massive machine type connections (mMTC), this technique is especially critical as it supports overloaded transmission. On the other hand, massive multiple input multiple output (MIMO) is the key technique in 5G. The combined application of both MIMO and NOMA would be crucially important for 5G scenarios. However, in massive MIMO system, full channel information for massive users at transmitter side is highly difficult to achieve or can cause high feedback overhead. Additionally, the traditional user selection for concurrent transmission may be no longer applicable when precoding at transmitter and receiver sides exist.

BRIEF SUMMARY

This section is intended to include examples and is not intended to be limiting.

According to one example embodiment, a method comprises: sending codebook based training information to at least one UE; receiving Precoding Index reports from said at least one UE; grouping said at least one UE into at least one group, wherein the UEs in the same group are covered by the same transmitting precoding; sending beamformed CSI-RS in accordance with said at least one groups; receiving CSI reports from UEs of said at least one group, so as to transfer data to said at least one UE accordingly.

According to one example embodiment, a method comprises: receiving codebook-based training information from BS; selecting the best precoder in accordance with said codebook-based training information; sending a precoding index reports to said BS, said precoding index reports including index of said best precoder; receiving a beamformed CSI-RS from said BS; sending CSI in accordance with said beamformed CSI-RS to said BS.

According to another example embodiment, a first apparatus, comprises: at least one processor; and at least one memory including computer program code, the at least one memory and the computer program code configured to, with the at least one processor, cause the first apparatus to perform at least the following: send codebook based training information to at least one UE; receive precoding index reports from said at least one UE; group said at least one UE into at least one group, wherein the UEs in the same group are covered by the same transmitting precoding; send beamformed CSI-RS in accordance with said at least one group; receive CSI reports from UEs of said at least one group, so as to transfer data to said at least one UE accordingly.

According to another example embodiment, a second apparatus, comprises: at least one processor; and at least one memory including computer program code, the at least one memory and the computer program code configured to, with the at least one processor, cause the second apparatus to perform at least the following: receive codebook-based training information from BS; select the best precoder in accordance with said codebook-based training information; send precoding index reports to said BS, said precoding index reports including index of said best precoder; receive beamformed CSI-RS from said BS; send CSI in accordance with said beamformed CSI-RS to said BS.

According to another example embodiment, a computer program product comprising a non-transitory computer-readable medium storing computer program code thereon which when executed by a device causes the device to perform at least: send codebook based training information to at least one UE; receive Precoding Index reports from said at least one UE; group said at least one UE into at least one group, wherein the UEs in the same group are covered by the same transmitting precoding; send beamformed CSI-RS in accordance with said at least one group; receive CSI reports from UEs of said at least one group, so as to transfer data to said at least one UE accordingly.

According to another example embodiment, a computer program product comprising a non-transitory computer-readable medium storing computer program code thereon which when executed by a device causes the device to perform at least: receive codebook-based training information from BS; select the best precoder in accordance with said codebook-based training information; send a precoding index reports to said BS, said precoding index reports including index of said best precoder; receive beamformed CSI-RS from said BS; send CSI in accordance with said beamformed CSI-RS to said BS.

BRIEF DESCRIPTION OF THE DRAWINGS

For proper understanding of the invention, reference should be made to the accompanying drawings, wherein.

DETAILED DESCRIPTION

The word "exemplary" is used herein to mean "serving as an example, instance, or illustration."

Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention, which is defined by the claims.

In some embodiment, the method according to this disclosure is implemented by a first apparatus; in some embodiments, the method according to this disclosure is implemented by a first apparatus and a second apparatus.

Herein, the first apparatus could be a Base Station (BS), or could be a component or device that is able to implement all the steps of the according method, which could be included in a Base Station or other equipment with equivalent or similar functions. The second apparatus could be a User Equipment (UE), or could be a component or device that is able to implement all the steps of the according method, which could be included in a User Equipment or other equipment with equivalent or similar functions.

The BS serves a wireless network with a massive Multiple Input Multiple Output (MIMO) antenna system. Especially, a system that is able to implement both non-orthogonal multiple access (NOMA) and orthogonal multiple access (OMA) scheme.

The exemplary embodiments herein describe techniques for hybrid of NOMA and OMA scheme in a massive MIMO antenna system. Additional description of these techniques is presented after a system into which the exemplary embodiments may be used is described.

Figure 1:
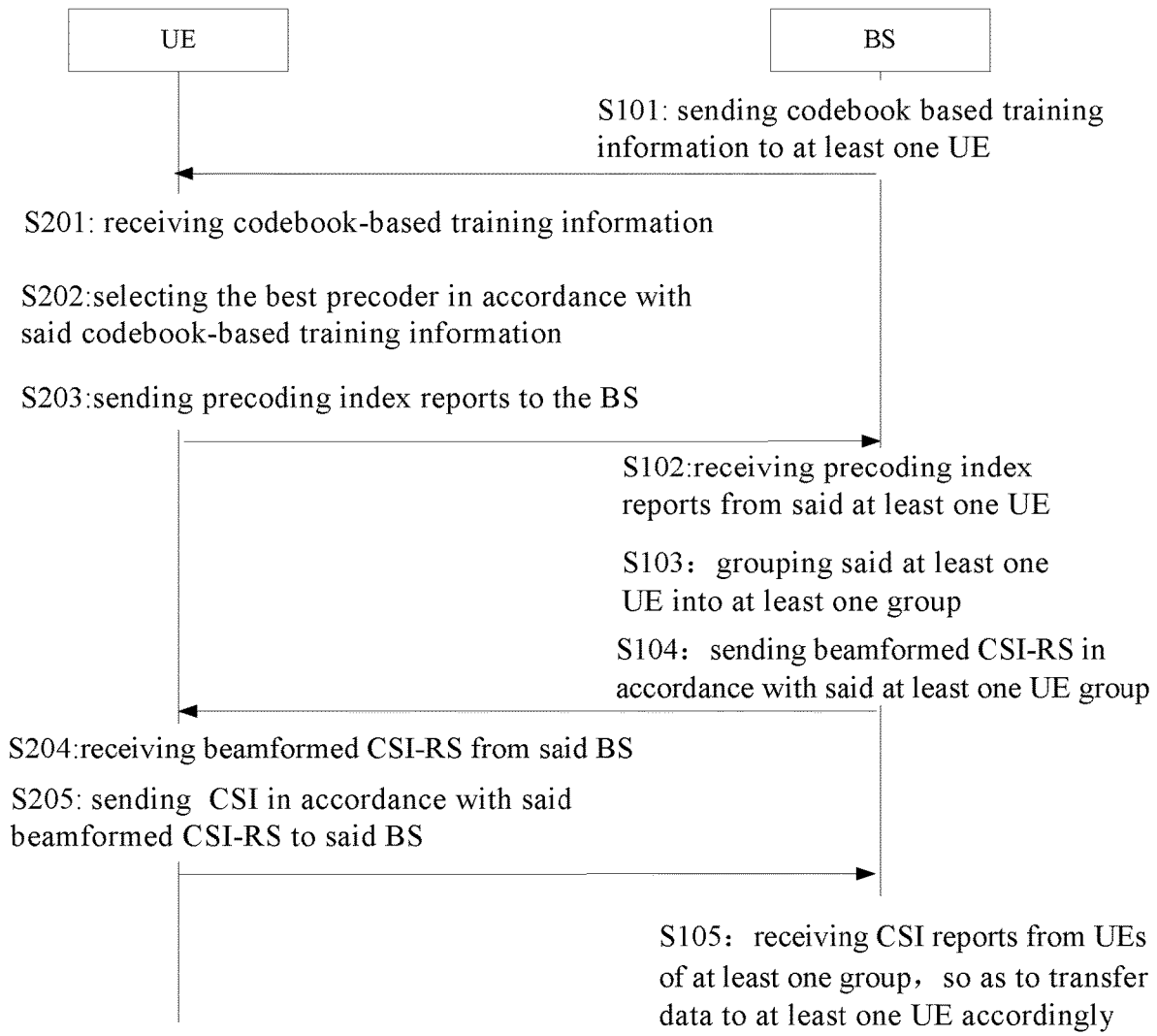
FIG. 1 illustrates the operation of an exemplary method or methods.

Turning to FIG. 1, this figure illustrates the operation of an exemplary method or methods.

The method according to an exemplary including steps S101, S102, S103, S104 and S105 implemented by a first apparatus, and steps S201, S202, S203, S204 and S205 implemented by a second apparatus.

In step S101, the first apparatus sends codebook-based training information to at least one UE.

Next, in step S201, the second apparatus receive codebook-based training information.

Then, in step S202, the second apparatus select the best precoder in accordance with said codebook-based training information.

The codebook-based training information herein is applied by the UEs to determine the precoding pairs of antennas at both BS side and UE side.

In some examples, the training process can be conducted based on frequency divided sweeping to save the resources, e.g., different training precoders are transmitted on different sub-bands. The UE selects the strongest transmitting precoders among all training ones and reports the index of the selected precoder.

Also, in the case that UE has multiple antennas (or antenna ports), the UE will sweep a codebook of itself and select a precoder to form a best pair.

Then, in step S203, the second apparatus sends precoding index reports to said BS, said precoding index reports including the index of said best precoder.

And in step S102, the first apparatus receives precoding index reports from the at least one UE.

The precoding index reports contain the index of the codebook based precoder that is chosen by the UE.

Then, in step S103, the first apparatus groups the at least one UE into at least one groups, wherein the UEs in the same group are covered by the same transmitting precoding.

The number of the at least one UE could be indicated by K, the number of the at least one group could be indicated by M, wherein M≤K.

Also, indicating the number of antennas of the BS with $N_t$, those skilled in the art could easily find an initial M that is smaller than $N_t$.

In one embodiment, the first apparatus firstly obtains a target number M, and groups the UEs with same precoding index into one group; then the first apparatus obtains a set Ω of precoding index of the groups after grouping the UEs with same precoding index, wherein |Ω| is the total number of said set Ω; if |Ω|>M, the first apparatus selects at least two groups to be aggregated; aggregates the at least two groups and updates the set Ω accordingly. The first apparatus repeat aggregates the groups until the total number |Ω|<M.

Also, if |Ω|<M, the first apparatus updates the value of M with the value of |Ω|.

Wherein, the first apparatus selects at least two groups to be aggregated based on at least one of the bellow:

(1) the distance of precoding index between two groups;

(2) the amount of UEs of the two groups.

For example, the first apparatus could aggregate two groups into one group if the distance of precoding index between the two groups are less than a predetermined threshold; or the first apparatus could aggregate two groups into one group if the amount of UEs of these two groups is the smallest, comparing that with other pairs of groups; or, the first apparatus could only aggregate two groups into one only when the distance between them less than the threshold of distance and the amount of UE of these two groups is the smaller than another threshold.

In a more specific example, $Ω_i$, i=1, 2, . . . , |Ω| indicates the element in the set Ω, which clearly is the precoding index selected from the set [1, 2, . . . , $|W_{BS}|$].

Then the distance of precoding index between two groups could be given by:

$$v_{Ω_i} = \mod\left(|Ω_i - Ω_{i'}|, \left\lceil \frac{|W_{BS}| + 1}{2} \right\rceil\right); \quad (1)$$

In which i' could be given by:

$$i' = \mod(i, |Ω|) + 1 \quad (2);$$

wherein $v_{Ω_i}$ is the distance between the i-th group and i'-th group, $\bar{v}$ is an adjustable threshold of distance, $Ω_i$ is the index of the i-th group in the set Ω, and $Ω_{i'}$ is the index of the i'-th group in the set Ω, and $|W_{BS}|$ is the number of precoders of said codebook.

And the first apparatus selects two groups to be aggregated if the two has a distance small than the threshold, and an amount of UEs no larger than current record of the smallest total UE number of two adjacent groups. For example, an possible code corresponding to the aggregation progress could be presented as below:

```
Input: Ω, M, K, v̄
Initialize: S₁ = S₂ = ... = S|Ω| = [ ];
For k = 1, 2, ..., K
    Let Sᵢ = Sᵢ ∪ {k} if the k-th user selected the transmit precoding with
    index Ωᵢ.
End For
If |Ω| < M
    M = |Ω|;
Else
    While |Ω| > M
        υₘᵢₙ = K; iₘᵢₙ = 0;
        For i = 1, 2, ..., |Ω|
            Calculate i' and v_Ωᵢ using equation (2) and (1) respectively;
            υ_Ωᵢ = |Sᵢ| + |Sᵢ'|;
            If v_Ωᵢ < v̄ && υ_Ωᵢ < υₘᵢₙ
                υₘᵢₙ = υ_Ωᵢ; iₘᵢₙ = i;
            End if
        End for
        If iₘᵢₙ = 0
            v̄ = v̄ + 1;
        Else
```

$$S_{i_{min}} = S_{i_{min}} \cup S_{i'_{min}}; \quad \Omega = \Omega / \{\Omega_{i_{min}}, \Omega_{i'_{min}}\}; \quad \Omega = \Omega \cup \left\{ \frac{\Omega_{i_{min}} + \Omega_{i'_{min}}}{2} \right\};$$

```
        End if
    End while
End if
Return: S₁, S₂, ..., S|Ω|;
```

Wherein $S_i$ indicates the i-th group, and $S_{i'}$ indicates the i'-th group, $i_{min}$ and $i'_{min}$ indicate the serial numbers of two group that currently meet the condition, $\vartheta_{\Omega_i}$ indicates the total amount of UEs of the i-th group and the i'-th group; $\vartheta_{min}$ indicates temporal recording of the smallest total UE number of two adjacent groups; and since the meanings of other characters have been described above in this description, we will not repeat here.

According to this specific but non-restrictive example, in case the $i_{min}$-th group and $i'_{min}$-th group meet the condition, the corresponding elements $\Omega_{i_{min}}$ and $\Omega_{i'_{min}}$ are replaced by a intermedia value $$\frac{\Omega_{i_{min}} + \Omega_{i'_{min}}}{2}$$

in the set $\Omega$.

However, it is easy for those skilled in the art, based on the disclosure of current disclosure, to understand that there might be different ways to update the element of set $\Omega$. And all those equivalent ways to update the set $\Omega$ should be seen as covered by the claims of this application.

In some examples, NOMA is applied to the group(s) with multiple UEs, to cancel the intra-group interference among UEs.

And in some examples, OMA is also applied to the group(s) with single UE.

Then, in step S104, the first apparatus sends beamformed CSI-RS in accordance with said at least one group.

Correspondingly, in step S204, the second apparatus receives beamformed CSI-RS from said BS.

And the second apparatus estimates the effective channels based on the beamformed CSI-RI. Since the UEs has been grouped into M groups, and the UEs in the same group are covered by the same transmitting precoding, the channel with $N_t$ antenna ports are reduced to that with M ($M<N_t$) beam ports. Therefore, the second apparatus only needs to report the effective channel of M dimensions.

And next, in step 205, the second apparatus send CSI in accordance with said beamformed CSI-RS to said BS.

As being mentioned above, the CSI only needs to report the effective channel of M dimensions.

Then in step S105, the first apparatus receives CSI reports from UEs of said at least one groups, so as to transfer data to said at least one UE accordingly.

Specifically, the first apparatus receives CSI reports from UEs of said at least one group, conducts multi-group precoding to cancel the inter-group interference to obtains a final precoding matrix, so as to transfer data to said at least one UE accordingly. And those skilled in the art could understand that various algorithms, such as block diagonal (BD), can be used to determine the multi-group precoding.

Herein indicating FP as the final precoding matrix used by the first apparatus, and the FP is normalized to satisfy $\|FP\|_F^2 = M$. In which F denotes the first stage matrix of precoders chosen by UEs received in step S102, and P is the matrix used for inter-group interference cancelation.

The first apparatus can obtain the matrix P through various methods. As with transmitting the first stage matrix F, the first apparatus can then send precoded reference signals (RS) for UEs to estimate the effective channel $\tilde{H}$, which has the reduced dimension of only K×M. The reduced-rank matrix P can then be determined based on effective channel information $\tilde{H}$. The effective channel with the matrix F can be written as:

$$\overline{H} = \begin{bmatrix} v_{1,1}^H H_{1,1} f_1 & v_{1,1}^H H_{1,1} f_2 & \cdots & v_{1,1}^H H_{1,1} f_M \\ \vdots & \vdots & & \vdots \\ v_{1,K_1}^H H_{1,K_1} f_1 & v_{1,K_1}^H H_{1,K_1} f_2 & & v_{1,K_1}^H H_{1,K_1} f_M \\ v_{2,1}^H H_{2,1} f_1 & v_{2,1}^H H_{2,1} f_2 & & v_{2,1}^H H_{2,1} f_M \\ \vdots & \vdots & \ddots & \vdots \\ v_{2,K_1}^H H_{2,K_1} f_1 & v_{2,K_1}^H H_{2,K_1} f_2 & & v_{2,K_1}^H H_{2,K_1} f_2 \\ \vdots & & & \\ v_{M,K_M}^H H_{M,K_M} f_1 & v_{M,K_M}^H H_{M,K_M} f_2 & \cdots & v_{M,K_M}^H H_{M,K_M} f_M \end{bmatrix} = \begin{bmatrix} \overline{H}_1 \\ \overline{H}_2 \\ \vdots \\ \overline{H}_M \end{bmatrix} \quad (3)$$

Herein the matrix $\overline{H}$ has $K_1+K_2+\ldots+K_m=K$ rows in total, therefore, $\overline{H}$ is a matrix with a dimension of K×M, $f_m$ is the m-th column vector of the first stage precoding matrix F in corresponding to the UEs in the m-th group. And to each $\overline{H}_m$, m=1, 2, . . . , M in the equation (3), $\overline{H}_m$ contains $K_m$×M elements.

In order to cancel the inter-group interference, at the m-th group, it is required that $$\overline{H}_m \sum_{i=1, i \neq m}^{M} P_i \tilde{s}_i = 0.$$

In other words, the precoding for the i-th group needs to be orthogonal with channels of other groups, i.e., $\overline{H}_m P_i=0$ for all m≠i. To obtain $P_m$, we perform singular vector decomposition (SVD) to the following matrix:

$$\hat{H}_m = \begin{bmatrix} \overline{H}_1 \\ \vdots \\ \overline{H}_{m-1} \\ \overline{H}_{m+1} \\ \vdots \\ \overline{H}_M \end{bmatrix} = U_m \sum_m [V_m^{(1)} \quad V_m^{(0)}]^H \quad (4)$$

where $V_m^{(1)}$ denotes the first r right singular vectors, where r is the rank of matrix $\hat{H}_m$ and $V_m^{(0)}$ is the last M−r singular vector. It is notable that r<M only when K−$K_m$<M, which may not hold. When r=M, $V_m^{(0)}$ is set as the last singular vector. In this case, interference to other groups cannot be totally removed if K−$K_m$>M. Let $\overline{U}_m \overline{\Sigma}_n \overline{V}_m^H = H_m V_m^{(0)}$ the precoding vector $P_m$ is then determined as the first singular vector in $\overline{V}_m$.

And after BD precoding process, the first apparatus conducts a process of data transmitting.

Firstly, the signal vector to be transmitted, could be given by:

$$\tilde{s} = \begin{bmatrix} \alpha_{1,1} s_{1,1} + \ldots + \alpha_{1,K_1} s_{1,K_1} \\ \vdots \\ \alpha_{M,1} s_{M,1} + \ldots + \alpha_{M,K_1} s_{M,K_1} \end{bmatrix} = \begin{bmatrix} \tilde{s}_1 \\ \vdots \\ \tilde{s}_M \end{bmatrix}; \quad (5)$$

wherein the number of UEs is K, the number of said at least one groups is M, each group in the M groups has $K_m$ users, m=1, 2, . . . , M; $s_{m,k}$ is the signal and the $\alpha_{m,k}$ is the NOMA power allocation coefficient respectively for the k-th user in the m-th group, and the received signal is given by:

$$y_{m,k} = v_{m,k}^H H_{m,k} FP\tilde{s} + v_{m,k}^H n \quad (6);$$

where $v_{m,k}$ is the receiving beamforming vector for the k-th user in the m-th group, and $H_{m,k}$ is the channel information for the k-th user in the m-th group, Let $P_i$ denote the i-th column of the matrix P, equation (6) can also be written as:

$$y_{m,k} = v_{m,k}^H H_{m,k} FP_m \alpha_{m,k} s_{m,k} + \quad (7)$$
$$v_{m,k}^H H_{m,k} FP_m \sum_{i \neq k} \alpha_{m,i} s_{m,i} + v_{m,k}^H H_{m,k} F \sum_{j \neq m} P_j \tilde{s}_j + v_{m,k}^H n;$$

With equations (3) to (5), the first apparatus could obtain the signal to interference and noise ratio (SINR) at UE, which is the k-th UE in the m-th group, and the SINR is given by:

$$SINR_{m,k} = \frac{|v_{m,k}^H H_{m,k} FP_m|^2 \alpha_{m,k}^2}{\sum_{i \neq k} |v_{m,k}^H H_{m,k} FP_m|^2 \alpha_{m,k}^2 + \sum_{j \neq m} |v_{m,k}^H H_{m,k} FP_j|^2 + |v_{m,k}|^2/\rho}; \quad (8)$$

wherein ρ represents the transmit signal to noise ratio (SNR).

According to the embodiments of the present disclosure, with the hybrid of NOMA and OMA technical, the channel feedback overhead can be significantly reduced. For each of the K UEs, this hybrid scheme only needs to report M dimensional channel information plus one precoding index. Since the full channel feedback has to report the $N_t$ dimensional channel information for K users, which is daunting in practice since the number N and K are both large.

By applying hybrid MIMO-NOMA and MIMO-OMA scheme, the channel feedback overhead is significantly reduced so that it is feasible in practice, and such scheme can achieve the high performance while reduce the implementation complexity. Also, the combination of inter-group interference cancelation by linear precoding and intra-group interference cancelation with NOMA can effectively deal with the interference at UE side and guarantee the performance. The combination of OMA and NOMA scheme as well as the proposed user grouping can simultaneously properly serve both correlated UEs (for which linear precoding cannot guarantee the performance), and the uncorrelated (orthogonal) UEs.

Figure 3:
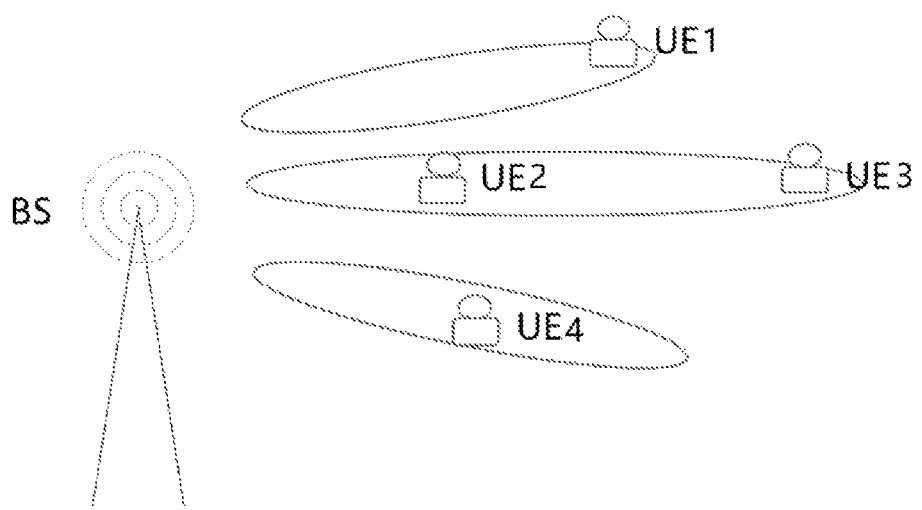
FIG. 3 illustrates a block diagram of an exemplary downlink system with hybrid NOMA and OMA processing according to certain embodiments.
Figure 4:
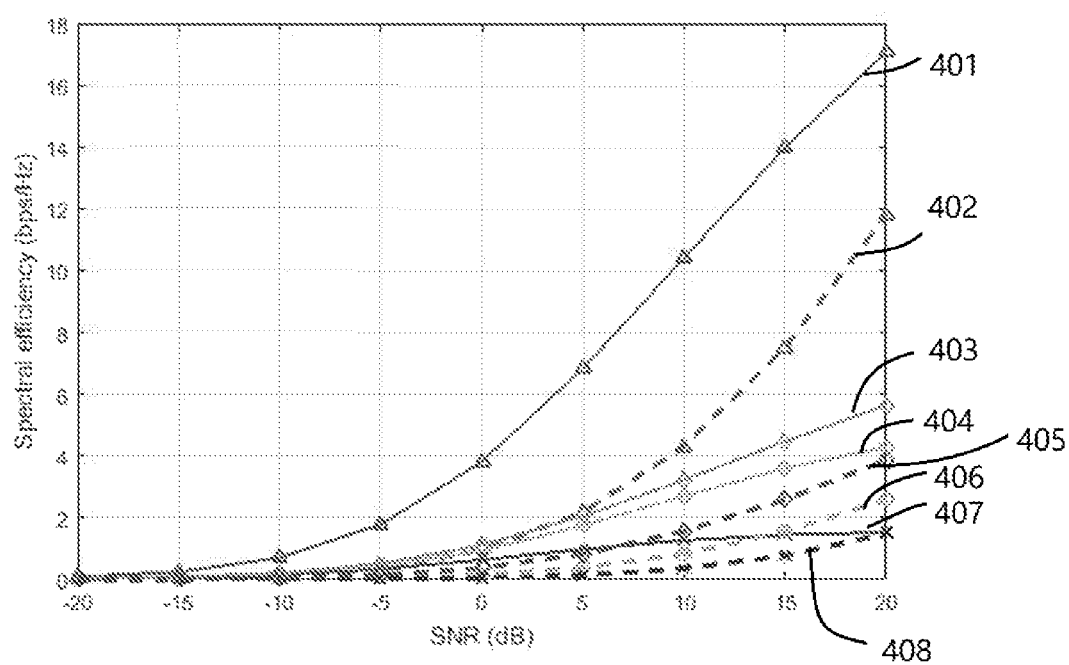
FIG. 4 illustrates a diagram of spectral efficiency comparison according to certain embodiments.

Considering a simple scenario to evaluate the proposed hybrid reduced-rank precoding for simplicity. Referring to FIG. 3 and FIG. 4, FIG. 3 illustrates a downlink system with a BS and 4 single-antenna UEs (UE1-UE4). The BS is equipped with 4 antennas and serves 4 UEs simultaneously. The 4×4 DFT matrix is applied as the codebook of first stage precoding, that is, the matrix F in this case. In this scenario, 2 UEs (UE2 and UE3) are at the same direction, so that the channels are correlated, and the same precoding index is selected by these 2 UEs. That is these 2 UEs (UE2 and UE3) are in the same group. And also referring to FIG. 3, the rest 2 UEs (UE1 and UE4) are in the other 2 groups respectively.

And the block diagonal (BD) based precoding algorithm, which is explained in accordance with equations (5) to (8), is then applied to cancel the inter-group interference. The 2 UEs (UE1 and UE4) in separate groups are served by OMA processing and the 2 UEs (UE2 and UE3) in the same group are served by NOMA processing. While the power allocation is applied with NOMA processing is given by:

$$\alpha_{m,k} = \frac{\prod_{i=1,i\neq k}^{K_m} (v_{m,i}^H H_{m,i} f_m)}{\sum_{j=1}^{K_m} \left( \prod_{i=1,i\neq j}^{K_m} (v_{m,i}^H H_{m,i} f_m) \right)} E_m \quad (9)$$

Wherein $E_m$ is the total transmission power for the m-th group. Successive interference cancelation receiver is applied in group with multiple UEs.

Further referring to FIG. 4, FIG. 4 illustrates a diagram of spectral efficiency comparison according to certain embodiments. Specifically, FIG. 4 shows a comparison of spectral efficiency with certain SNRs between the 4 UEs in the hybrid scenario as shown in FIG. 3, and such 4 UEs in a pure OMA scenario.

The line 401 depicts the spectral efficiency (SE) of total 4 UEs in a hybrid scenario as shown in FIG. 3, line 402 depicts the SE of total 4 UEs in a pure OMA scenario, line 403 depicts the average SE of the two groups with a single UE in the hybrid scenario, line 404 depicts the SE of a stronger UE in the group with 2 UEs in the hybrid scenario, line 405 depicts the average SE of the two groups with a single UE in the pure OMA scenario, line 406 depicts the SE of a stronger UE (e.g. UE2, as it is closer to BS) in the group with 2 UEs in the pure OMA scenario, line 407 depicts the SE of the weaker UE (e.g. UE3, as it is less close to BS) in the group with 2 UEs in the hybrid scenario, line 408 depicts the SE of the weaker UE in the group with 2 UEs in the pure OMA scenario.

And it is obvious that applying hybrid NOMA and OMA can provides obvious benefits over pure OMA when some of the UEs are correlated. Also, the results validate the performance of the proposed reduced-rank precoding. And it also can be seen that the mean SE of the UEs in single UE group can achieve high performance in the proposed hybrid scenario. In addition to correlated users, applying hybrid NOMA and OMA can achieve higher performance than pure OMA scheme for those in single-user groups.

Figure 2:
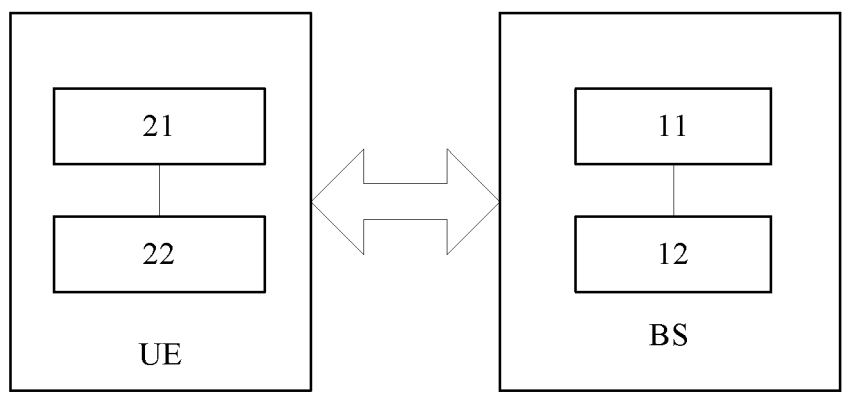
FIG. 2 illustrates a one possible and non-limiting exemplary system in which the exemplary embodiments may be practiced.

Referring to FIG. 2, FIG. 2 illustrates block diagram of a one possible and non-limiting exemplary system, in which the exemplary embodiments may be practiced.

Specifically, FIG. 2 shows a block diagram of a simple system with both a first apparatus and a second apparatus.

Wherein the first apparatus comprises at least one processor 11; and at least one memory 12 including computer program code. The at least one memory 12 and the computer program code configured to, with the at least one processor 201, cause the first apparatus to perform operation of at least the following: send codebook based sweeping information to at least one UE; receive Precoding Index reports from said at least one UE; group said at least one UE into at least one group, wherein the UEs in the same group are covered by the same transmitting precoding; send beamformed CSI-RS in accordance with said at least one group; receive CSI reports from UEs of said at least one group, so as to transfer data to said at least one UE accordingly.

The second apparatus, comprises at least one processor 21; and at least one memory 22 including computer program code, the at least one memory 22 and the computer program code configured to, with the at least one processor 21, cause the second apparatus to perform operation of at least the following: receive codebook-based training information; select the best precoder in accordance with said codebook-based training information; send a precoding index reports to said BS, said precoding index reports including index of said best precoder; receive a beamformed CSI-RS from said BS; send a CSI in accordance with said beamformed CSI-RS to said BS.

The operations of the first apparatus and the second apparatus are similar with the steps that have been described above and will not repeated herein.

Also, a computer program product is disclosed. The computer program product comprising a non-transitory computer-readable medium storing computer program code thereon which when executed by a device causes the device to perform at least: send codebook based sweeping information to at least one UE; receive Precoding Index reports from said at least one UE; group said at least one UE into at least one group, wherein the UEs in the same group are covered by the same transmitting precoding; send beamformed CSI-RS in accordance with said at least one group; receive CSI reports from UEs of said at least one group, so as to transfer data to said at least one UE accordingly.

And a computer program product comprising a non-transitory computer-readable medium storing computer program code thereon which when executed by a device causes the device to perform at least: receive codebook-based training information; select the best precoder in accordance with said codebook-based training information; send precoding index reports to said BS, said precoding index reports including index of said best precoder; receive beamformed CSI-RS from said BS; send CSI in accordance with said beamformed CSI-RS to said BS.

For a person skilled in the art, it is apparent that the present disclosure is not limited to the details of the above exemplary embodiments, and the present disclosure can be implemented in other specific forms without departing from the spirit or essential characteristics of the present disclosure. Therefore, the embodiments should be regarded as exemplarily and not restrictive, and the scope of the present disclosure is defined by the appended claims rather than the above description, and therefore it is intended that the claims All changes that come within the meaning and range of equivalency of the invention are encompassed by the invention. Any reference signs in the claims should not be regarded as limiting the involved claims. In addition, it is clear that the word "comprising" does not exclude other units or steps, and the singular does not exclude the plural. The multiple units or devices recited in the system claims may also be implemented by one unit or device through software or hardware. Words such as first, second, etc., are used to indicate a name and do not indicate any specific order.

The following abbreviations that may he found in the specification and/or the drawing figures are defined as follows:

BD block diagonal
BS base station
CSI channel state information
MIMO massive multiple input multiple output
mMTC massive machine type connections
NOMA non-orthogonal multiple access
OMA orthogonal multiple access
RS reference signals
SE spectral efficiency
SINR signal to interference and noise ratio
SNR signal to noise ratio
SVD singular vector decomposition
UE user equipment

The invention claimed is:
1. A method, comprises:
sending from a base station codebook based training information to at least one user equipment;
receiving, by the base station, precoding index reports from said at least one user equipment, the precoding index reports comprising an index of a best precoder selected by the at least one user equipment in accordance with said codebook-based training information;
grouping, by the base station using at least the precoding index reports, said at least one user equipment into at least one group of multiple groups, wherein grouping comprises:
  grouping user equipments with a same precoding index into one group of the multiple groups;
  obtaining a set of precoding indexes of the multiple groups;
  selecting at least two groups of the multiple groups to be aggregated based on a total number of indexes in the set being larger than a target number and based on distance between the at least two groups of the multiple groups, wherein the distance is based on a number of precoders of a codebook; and
  aggregating said at least two groups into a single group;
sending, by the base station to the at least one group that comprises the single group, beamformed channel state information reference signals in accordance with said at least one group; and
receiving, by the base station, channel state information reports from said at least one user equipment of said at least one group, so as to transfer data to said at least one user equipment of said at least one group accordingly.

2. Said method of claim 1, wherein:
the target number is M;
the set of precoding indexes of the multiple groups is $\Omega$, wherein $|\Omega|$ is the total number of said set $\Omega$;
selecting at least two groups of the multiple groups to be aggregated is based on $|\Omega|>M$;
aggregating said at least two groups into a single group comprises aggregating said selected at least two groups;
updating said set $\Omega$ accordingly, and
repeat aggregating until the total number $|\Omega|\leq M$.

3. Said method of claim 2, wherein:
a distance between each group is given by:

$$v_{\Omega_i} = \mathrm{mod}\left(|\Omega_i - \Omega_{i'}|, \left\lceil \frac{|W_{BS}|+1}{2} \right\rceil\right);$$

wherein i'=mod (i, $|\Omega|$)+1, $v_{\Omega_i}$ is the distance between the i-th group and i'-th group, $\Omega_i$ is the precoding index of the i-th group in the set $\Omega$, $\Omega_{i'}$ is the precoding index of the i'-th group in the set $\Omega$, and $|W_{BS}|$ the number of precoders of the codebook; and
the selecting the at least two groups uses distances between the at least two groups of the multiple groups.

4. Said method of claim 1, wherein the selecting the at least two groups further comprises:
selecting two groups based on the distance is based on:
a distance of precoding index between two groups.

5. Said method of claim 1, wherein non-orthogonal multiple access is applied to the group with multiple user equipments.

6. Said method of claim 1, wherein said channel state information reports includes the effective channel information, and the receiving channel state information reports further comprises:
receiving said effective channel information from user equipments of said at least one group;
conducting multi-group precoding to cancel inter-group interference between said at least one group; and
obtaining a final precoding matrix to transfer data to said at least one user equipment accordingly.

7. Said method of claim 6, wherein the effective channel information $\overline{H}$ with a first stage precoding matrix F is given by:

$$\overline{H} = \begin{bmatrix} v_{1,1}^H H_{1,1} f_1 & v_{1,1}^H H_{1,1} f_2 & \cdots & v_{1,1}^H H_{1,1} f_M \\ \vdots & \vdots & & \vdots \\ v_{1,K_1}^H H_{1,K_1} f_1 & v_{1,K_1}^H H_{1,K_1} f_2 & & v_{1,K_1}^H H_{1,K_1} f_M \\ v_{2,1}^H H_{2,1} f_1 & v_{2,1}^H H_{2,1} f_2 & & v_{2,1}^H H_{2,1} f_M \\ \vdots & \vdots & \ddots & \vdots \\ v_{2,K_1}^H H_{2,K_1} f_1 & v_{2,K_1}^H H_{2,K_1} f_2 & & v_{2,K_1}^H H_{2,K_1} f_2 \\ \vdots & \vdots & & \vdots \\ v_{M,K_M}^H H_{M,K_M} f_1 & v_{M,K_M}^H H_{M,K_M} f_2 & \cdots & v_{M,K_M}^H H_{M,K_M} f_M \end{bmatrix} = \begin{bmatrix} \overline{H}_1 \\ \overline{H}_2 \\ \vdots \\ \overline{H}_M \end{bmatrix},$$

wherein $\overline{H}$ is a matrix with a dimension of K×M, m=1, 2, ..., M and k=1, 2, ..., K; $v_{m,k}$ is the receiving beamforming vector for the k-th user in the m-th group, and $H_{m,k}$ is the channel information for the k-th user in the m-th group,
$f_m$ is the m-th column vector of the first stage precoding matrix F in corresponding to user equipments in the m-th group, and to each $\overline{H}_m$ in the equation for $\overline{H}$, $\overline{H}_m$ contains $K_m$×M elements;
and with singular vector decomposition to the following matrix:

$$\hat{H}_m = \begin{bmatrix} \overline{H}_1 \\ \vdots \\ \overline{H}_{m-1} \\ \overline{H}_{m+1} \\ \vdots \\ \overline{H}_M \end{bmatrix} = U_m \sum\nolimits_m [\, V_m^{(1)} \quad V_m^{(0)}\,]^H,$$

where $P_m$ at the m-th group is obtained through $$\overline{H}_m \sum_{i=1, i \neq m}^{M} P_i \tilde{s}_i = 0$$

wherein $V_m^{(1)}$ denotes the first r right singular vectors, where r is the rank of matrix $\hat{H}_m$ and $V_m^{(0)}$ is the last M−r singular vector, and $\tilde{s}_i$ denotes the i-th signal vector to be transmitted.

8. A method, comprises:
receiving by a user equipment codebook-based training information from a base station;
selecting, by the user equipment, a best precoder in accordance with said codebook-based training information at least by applying the codebook-based training information by the user equipment to determine an index of a best precoder;
sending, by the user equipment, precoding index reports to the base station, said precoding index reports including said index of said best precoder;

receiving, by the user equipment, beamformed channel state information reference signals from said base station, wherein said beamformed channel state information reference signals are based on at least one group that has been selected by aggregating at least two groups of multiple groups based on a total number of indexes in a set of precoding indexes of the multiple groups being larger than a target number, and based on distance between the at least two groups of the multiple groups, wherein the distance is based on a number of precoders of a codebook, and wherein said at least two groups have been aggregated into a single group, and the user equipment is part of the single group; and sending, by the user equipment, channel state information in accordance with said beamformed channel state information reference signals to said base station.

9. An apparatus, comprises:

at least one processor; and at least one memory storing program code that, when executed by the at least one processor, cause the apparatus at least to perform:

sending from a base station codebook based sweeping information to at least one user equipment;

receiving, by the base station, precoding index reports from said at least one user equipment, the precoding index reports comprising an index of a best precoder selected by the at least one user equipment in accordance with said codebook-based training information;

grouping, by the base station using at least the precoding index reports, said at least one user equipment into at least one group of multiple groups, wherein grouping comprises:

grouping user equipments with a same precoding index into one group of the multiple groups;

obtaining a set of precoding indexes of the multiple groups;

selecting at least two groups of the multiple groups to be aggregated based on a total number of indexes in the set being larger than a target number and based on distance between the at least two groups of the multiple groups, wherein the distance is based on a number of precoders of a codebook; and aggregating said at least two groups into a single group;

sending, by the base station to the at least one group that comprises the single group, beamformed channel state information reference signals in accordance with said at least one group; and;

receiving, by the base station, channel state information reports from said at least one user equipment of said at least one group, so as to transfer data to said at least one user equipment of said at least one group accordingly.

10. Said apparatus of claim 9, wherein:

the target number is M;

obtaining the set of precoding indexes of the multiple groups is $\Omega$, wherein $|\Omega|$ is the total number of said set $\Omega$;

selecting at least two groups of the multiple groups to be aggregated is based on $|\Omega|>M$, aggregating said at least two groups into a single group comprises aggregating said selected at least two groups;

updating said set $\Omega$ accordingly, and repeating aggregating until the total number $|\Omega|\leq M$.

11. Said apparatus of claim 10, wherein:
a distance between each group is given by:

$$v_{\Omega_i} = \mod\left(|\Omega_i - \Omega_{i'}|, \left\lceil \frac{|W_{BS}|+1}{2} \right\rceil\right);$$

wherein i'=mod (i, $|\Omega|$)+1, $v_{\Omega_i}$ is the distance between the i-th group and i'-th group, $\Omega_i$ is the precoding index of the i-th group in the set $\Omega$, $\Omega_{i'}$ is the precoding index of the i'-th group in the set $\Omega$, and $|W_{BS}|$ is the number of precoders of the codebook; and the selecting the at least two groups uses distances between the at least two groups of the multiple groups.

12. Said apparatus of claim 10, wherein the selecting the at least two groups further comprises:

selecting two groups based on the distance is based on:

a distance of precoding index between two groups.

13. Said apparatus of claim 9, wherein non-orthogonal multiple access is applied to a group with multiple user equipments.

14. Said apparatus of claim 13, wherein said channel state information reports includes the effective channel information, and the receiving channel state information reports further comprises:

receiving said effective channel information from user equipments of said at least one group;

conducting multi-group precoding to cancel inter-group interference between said at least one group; and obtaining a final precoding matrix to transfer data to said at least one user equipment accordingly.

15. Said apparatus of claim 14, wherein the effective channel information $\overline{H}$ with a first stage precoding matrix F is given by::

$$\overline{H} = \begin{bmatrix} v_{1,1}^H H_{1,1} f_1 & v_{1,1}^H H_{1,1} f_2 & \ldots & v_{1,1}^H H_{1,1} f_M \\ \vdots & \vdots & & \vdots \\ v_{1,K_1}^H H_{1,K_1} f_1 & v_{1,K_1}^H H_{1,K_1} f_2 & & v_{1,K_1}^H H_{1,K_1} f_M \\ v_{2,1}^H H_{2,1} f_1 & v_{2,1}^H H_{2,1} f_2 & & v_{2,1}^H H_{2,1} f_M \\ \vdots & \vdots & \ddots & \vdots \\ v_{2,K_1}^H H_{2,K_1} f_1 & v_{2,K_1}^H H_{2,K_1} f_2 & & v_{2,K_1}^H H_{2,K_1} f_2 \\ \vdots & \vdots & & \vdots \\ v_{M,K_M}^H H_{M,K_M} f_1 & v_{M,K_M}^H H_{M,K_M} f_2 & \ldots & v_{M,K_M}^H H_{M,K_M} f_M \end{bmatrix} = \begin{bmatrix} \overline{H}_1 \\ \overline{H}_2 \\ \vdots \\ \overline{H}_M \end{bmatrix},$$

wherein $\overline{H}$ is a matrix with a dimension of K×M, m=1, 2, ..., M and k=1, 2, ..., K; $v_{m,k}$ is the receiving beamforming vector for the k-th user in the m-th group, and $H_{m,k}$ is the channel information for the k-th user in the m-th group, $f_m$ is the m-th column vector of the first stage precoding matrix F in corresponding to user equipments in the m-th group, and to each $\overline{H}_m$ in the equation for $\overline{H}$, $\overline{H}_m$ contains $K_m$×M elements;

and with singular vector decomposition to the following matrix:

$$\hat{H}_m = \begin{bmatrix} \overline{H}_1 \\ \vdots \\ \overline{H}_{m-1} \\ \overline{H}_{m+1} \\ \vdots \\ \overline{H}_M \end{bmatrix} = U_m \sum\nolimits_m [V_m^{(1)} \quad V_m^{(0)}]^H$$

where $P_m$ at the m-th group is obtained through $$\overline{H}_m \sum_{i=1, i \neq m}^{M} P_i \tilde{s}_i = 0$$

wherein $V_m^{(1)}$ denotes the first r right singular vectors, where r is the rank of matrix $\overline{H}_m$ and $V_m^{(0)}$ is the last M-r singular vector, and $\tilde{s}_i$ denotes the i-th signal vector to be transmitted.

16. An apparatus, comprises:
at least one processor; and
at least one memory storing program code that, when executed by the at least one processor, cause the apparatus at least to perform:
receiving by a user equipment codebook-based training information from a base station;
selecting, by the user equipment, a best precoder in accordance with said codebook-based training information at least by applying the codebook-based training information by the user equipment to determine an index of a best precoder;
sending, by the user equipment, precoding index reports to the base station, said precoding index reports including said index of said best precoder;
receiving, by the user equipment, beamformed channel state information reference signals from said base station, wherein said beamformed channel state information reference signals are based on at least one group that has been selected by aggregating at least two groups of multiple groups based on a total number of indexes in a set of precoding indexes of the multiple groups being larger than a target number, and based on distance between the at least two groups of the multiple groups, wherein the distance is based on a number of precoders of a codebook, and wherein said at least two groups have been aggregated into a single group, and the user equipment is part of the single group; and
sending, by the user equipment, channel state information in accordance with said beamformed channel state information reference signals to said base station.

17. A computer program product comprising a non-transitory computer-readable medium storing computer program code thereon which when executed by a device causes the device to perform at least:
sending from a base station codebook based sweeping information to at least one user equipment;
receiving, by the base station, precoding index reports from said at least one user equipment, the precoding index reports comprising an index of a best precoder selected by the at least one user equipment in accordance with said codebook-based training information;
grouping, by the base station using at least the precoding index reports, said at least one user equipment into at least one group of multiple groups, wherein grouping comprises:
grouping user equipments with a same precoding index into one group of the multiple groups;
obtaining a set of precoding indexes of the multiple groups;
selecting at least two groups of the multiple groups to be aggregated based on a total number of indexes in the set being larger than a target number and based on distance between the at least two groups of the multiple groups, wherein the distance is based on a number of precoders of a codebook; and
aggregating said at least two groups into a single group;
sending, by the base station to the at least one group that comprises the single group, beamformed channel state information reference signals in accordance with said at least one group; and;
receiving, by the base station, channel state information reports from said at least one user equipment of said at least one group, so as to transfer data to said at least one user equipment of said at least one group accordingly.

18. A computer program product comprising a non-transitory computer-readable medium storing computer program code thereon which when executed by a device causes the device to perform at least:
receiving by a user equipment codebook-based training information from a base station;
selecting, by the user equipment, a best precoder in accordance with said codebook-based training information at least by applying the codebook-based training information by the user equipment to determine an index of a best precoder;
sending, by the user equipment, precoding index reports to the base station, said precoding index reports including said index of said best precoder;
receiving, by the user equipment, beamformed channel state information reference signals from said base station wherein said beamformed channel state information reference signals are based on at least one group that has been selected by aggregating at least two groups of multiple groups based on a total number of indexes in a set of precoding indexes of the multiple groups being larger than a target number, and based on distance between the at least two groups of the multiple groups, wherein the distance is based on a number of precoders of a codebook, and wherein said at least two groups have been aggregated into a single group, and the user equipment is part of the single group; and
sending, by the user equipment, channel state information in accordance with said beamformed channel state information reference signals to said base station.

19. Said method of claim 1, wherein the selecting the at least two groups further comprises:
selecting the two groups based on:
an amount of user equipments of the two groups.

20. Said method of claim 1, wherein the selecting the at least two groups further comprises:
selecting two groups based on the distance is based on: a distance of precoding index between the two groups; and based on an amount of user equipments of the two groups.

* * * * *